M. J. EGERY.
Machine for Edging Lumber.

No. 207,596.  Patented Sept. 3, 1878.

WITNESS
Archur M. Mason
John R. Mason

INVENTOR
Marshall J. Egery
by Wm Franklin Seavey Atty

UNITED STATES PATENT OFFICE.

MARSHAL J. EGERY, OF BANGOR, MAINE.

IMPROVEMENT IN MACHINES FOR EDGING LUMBER.

Specification forming part of Letters Patent No. 207,596, dated September 3, 1878; application filed February 4, 1878.

*To all whom it may concern:*

Be it known that I, MARSHAL J. EGERY, of Bangor, in the county of Penobscot and State of Maine, have invented certain new and useful Improvements in Gang Circular Sawing Machines; and I do hereby declare that the following is a full, clear, and exact description thereof, that will enable others skilled in the art to which it appertains to make and use the same, reference being had to the accompanying drawings, forming a part of this specification, in which—

Figure 2:
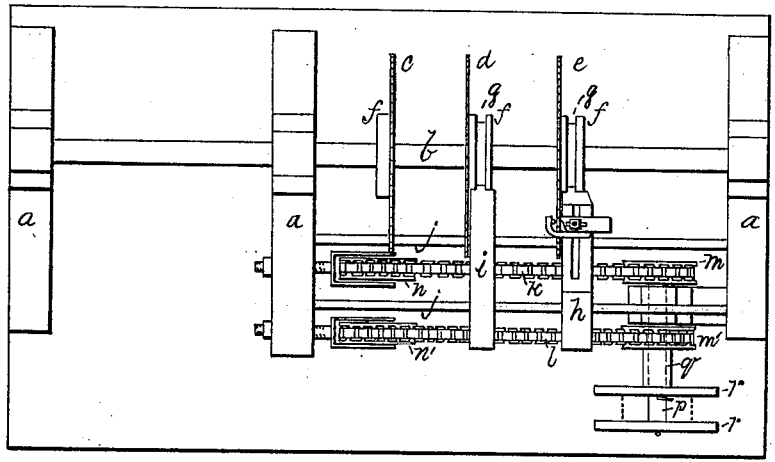
Figure 1:
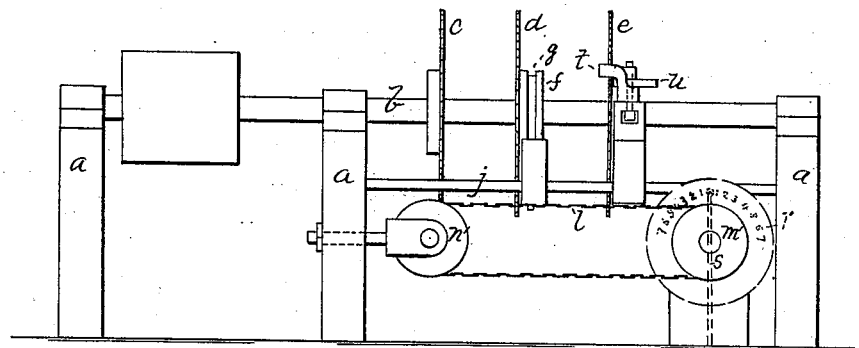
Figure 3:
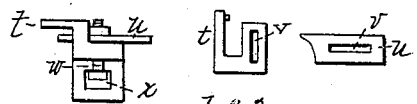

Figure 1 shows a front elevation; Fig. 2, a plan; Fig. 3, details of gage or guide.

Same letters show like parts.

My invention consists of improvements in gang circular sawing machines of that class in which the saws are movable upon the arbor for the purpose of regulating the width of the board sawed.

It consists, first, of devices for moving the saws and determining the distance between them; and, second, of devices for gaging them and preventing "running," or diverging from the proper line of saw-cut.

My invention will be understood by reference to the accompanying drawings.

The machine is provided with a suitable frame of ordinary construction, only partially shown at $a$. $b$ shows the saw-arbor, and $c$ $d$ $e$ the saws, secured to collars $f$. The saw $c$ is stationary, as common, while the others, $d$ $e$, with their collars, are movable lengthwise upon the arbor, said collars being formed with an annular groove, $g$ $g$, into which the shippers $h$ $i$ extend. These shippers travel upon rods $j$ $j$, parallel with the arbor, each actuated by an endless chain, $k$ $l$, respectively. These chains pass over sprocket-wheels $m$ $m'$ $n$ $n'$, secured at each side of the frame $a$, the pair $n$ $n'$ being adjustable to compensate for any wear of the chain. The sprocket-wheels $m$ $m'$ have shafts $p$ $q$, the shaft $p$ actuating the wheel $m$, chain $k$, and shipper $h$, passing through or telescoping the shaft $q$, which is hollow, so that each may be moved independently of the other, increasing or diminishing the distance between the saws and the width of the lumber cut.

Any number of saws, with accompanying shippers, chains, and sprocket-wheels, may be used, the shafts by which the sprocket-wheels $m$ are moved telescoping each other, as explained. Each shaft is provided with a hand-wheel, $r$, by which it may be turned, and may be supplied with an indicator, $s$, showing the distance which the saws traverse.

My device for gaging the saw consists of a clasp, $t$, extending around the periphery of the saw, together with a slide, $u$, acting against its opposite side, the saw running between them. Both clasp and slide are adjustable, as shown in the detail, by slots $v$, and are set and held in proper position by a bolt and nut, $w$, adjustable in a groove, $x$.

The whole device is secured to the shipper, moving with it, enabling the saw to be moved upon its arbor without disarranging the gage or guide.

What I claim as my invention, and desire to secure by Letters Patent, is—

1. In a circular sawing machine, the combination, substantially as shown, of the movable saws and shippers with the endless chains and sprocket-wheels, operating substantially as specified, for the purposes set forth.

2. The combination of a series of movable saws and actuating mechanism—to wit, sprocket-wheels $m$ $m'$ $n$ $n'$, chains $k$ $l$, and shippers $h$ $i$—with hand-wheels $r$, mounted on telescoping shafts $p$ $q$, substantially as described and shown.

3. In combination with a movable saw, as described, an adjustable guide or gage, consisting of a clasp, $t$, and slide $u$, adjustable by slots $v$, groove $x$, and bolt $w$, secured to and moving with the saw-shipper, substantially as and for the purposes described.

In testimony that I claim the foregoing I have hereunto set my hand this 14th day of January, 1878.

MARSHAL J. EGERY.

Witnesses:
GEO. F. GODFREY,
WM. FRANKLIN SEAVEY.